United States Patent [19]

Morrill et al.

[11] 3,987,419

[45] Oct. 19, 1976

[54] HIGH SPEED INFORMATION PROCESSING SYSTEM

[75] Inventors: Charles D. Morrill, Cuyohoga Falls; Willard C. Meilander, Kent, both of Ohio

[73] Assignee: Goodyear Aerospace Corporation, Akron, Ohio

[22] Filed: Dec. 5, 1974

[21] Appl. No.: 529,861

[52] U.S. Cl. .......................................... 340/172.5
[51] Int. Cl.² ........................................ G06F 13/08
[58] Field of Search ................... 445/1; 340/172.5

[56] References Cited
UNITED STATES PATENTS

| | | | |
|---|---|---|---|
| 3,116,410 | 12/1963 | Manna et al. | 340/172.5 |
| 3,566,358 | 2/1971 | Hasbrouck | 340/172.5 |
| 3,685,020 | 8/1972 | Meade | 340/172.5 |
| 3,787,673 | 1/1974 | Watson et al. | 340/172.5 X |

*Primary Examiner*—Harvey E. Springborn
*Attorney, Agent, or Firm*—J. G. Pere

[57] ABSTRACT

Disclosed is a unique high speed information processing system capable of storing and operating on large volumes of data without the necessity of complicated data file systems or sophisticated programming techniques. Fundamentally, the invention combines an associative processor having a content-addressable memory with a parallel disc magnetic memory. The disc memory is utilized for the bulk storage of data while the associative processor is utilized for performing logical and arithmetic operations on the data. Data transfers between the associative processor and the disc memory are controlled by a servomechanism and an interface circuit. The servomechanism guarantees that the disc memory will operate at a speed synchronous with signals created by the associative processor and the interface circuit, under the control of the associative processor, manipulates data transfers between the disc memory and the associative processor.

8 Claims, 5 Drawing Figures

HIGH SPEED INFORMATION PROCESSING SYSTEM

BACKGROUND OF THE INVENTION

In information retrieval systems, and in many command and control systems, it is necessary to obtain specific items of information from extensive files of data contained within the digital memory of the system. Heretofore, the complexity of searches for data within these files has generally been reduced by organizing the files and ordering their contents. However, this organization and ordering increases the programming required to maintain the file in order and either decreases flexibility of the system in responding to unforseen inquiries or requires excessive memory capacity. Even with such maintenance of the data files, search times are often still too long for many proposed system uses.

A proposed solution to this problem is to store the entire data file within a very large content-addressable or associative, memory. Such memories, which are conductive to parallel processing, allow extremely fast response to any query within the logical instruction library of the memory. The characteristics of such associative memories allow rapid responses without the necessity of ordering the information within the data files and without the requirements of sophisticated programming to maintain the files. However, associateve memory systems are quite expensive in that each word of the memory has associated therewith its own separate and distinct arithmetic unit or response store to achieve the parallel processing technique. Consequently, on a cost-effectiveness basis, it is unlikely that any system required to maintain extensive data files could afford an associative or content-addressable memory of sufficient size to provide the entire data storage capability.

Consequently, it is an object of the instant invention to present a high speed information processing system which maintains the attractive features of the content-addressable file while providing economical equipment costs.

It is a further object of the invention to present a high speed information processing system which utilizes a large mass memory bulk storage unit operating in conjunction with an associative processor.

Still another object of the invention is to present such an information processing system which interrelates and utilizes the desirable characteristics of an associative processor and a bulk disc memory system.

Yet another object of the invention is to present an associative processor having a virtually infinitely expandable memory array.

Still another object of the invention is to present a high speed information processing system which is rapid in processing time, accurate in operation, inexpensive to construct, and readily adaptable for any of a plurality of uses.

These objects and other objects which will become apparent as the detailed description proceeds are achieved by a high speed information processing system, comprising a data processor, a mass memory unit, separate and distinct from the data processor, wherein bulk data storage may be maintained, and means interconnecting the data processor and the mass memory to affectuate data transfer therebetween.

For a full understanding and appreciation of the techniques and apparatus of the invention reference should be had to the detailed description and accompanying drawings wherein:

Figure 1:
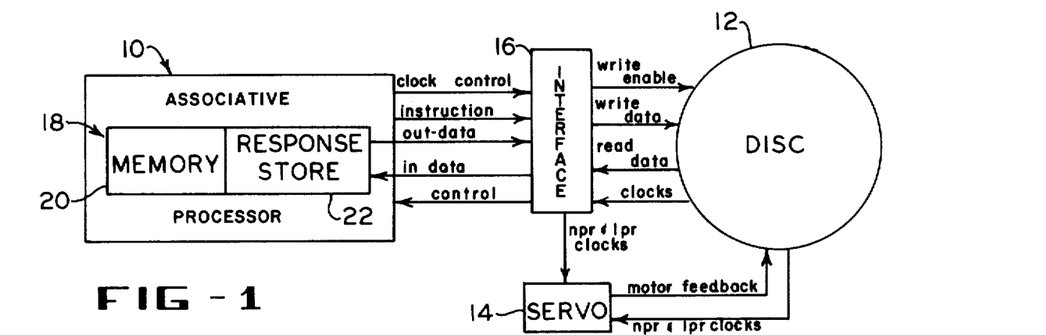
FIG. 1 is a block diagram showing of the apparatus o the invention.

Referring now to the drawings and more particularly FIG. 1, a block diagram illustration of the apparatus of the instant invention may be seen. As can be understood from this figure, the invention basically comprises a solid state associative processor 10 interrelating with a parallel disc memory 12 through a servo-mechanism 14 and interface circuitry 16. The solid state associative processor 10 is preferably constructed according to the teachings set forth in the U.S. patents recited hereinbelow. The associative processor 10 is capable of processing data in either a bitoriented mode or a word-oriented mode. In other words, it may process data associated therewith serial by bit and parallel by word or parallel by bit and serial by word. This multi-dimensional processing ability is achieved by the associative array 18 which comprises a memory 20 and a response store 22. Also associated with the associative array 18 is a permutation network (not shown). It is contemplated that the memory 20 will be according to the teachings of U.S. patent application Ser. No. 253,388, filed May 15, 1972 and now U.S. Pat. No. 3,800,289, issued Mar. 26, 1974, and the permutation network will be according to U.S. patent application Ser. No. 291,850, filed Sept. 25, 1972 and now U.S. Pat. No. 3,812,467, issued May 21, 1974.

While the instant invention preferably utilizes the solid state associative processor 10 and the associated array 18 according to the teachings of the above-mentioned patent applications, it is to be understood that other associative processors utilizing other associative arrays may be implemented. Indeed, U.S. patent application Ser. No. 1495 filed Dec. 29, 1969 (now U.S. Pat. No. 3,863,233, issued Jan. 28, 1975) discloses an associative processor readily conducive to implementation in the instant invention. Further, that patent application fully discloses the arithmetic unit or response store 22 which provides the parallel operability feature of the associative processor; that is, it provides for parallel inputs and outputs from the memory 20 and further provides for simultaneous processing of a multiplicity of bits associated therewith.

For a complete understanding of the operational techniques and apparatus of the associative processor 10 and its associative array 18 reference should be had to the above-identified patent applications. However, suffice it to say that each word of the memory has associated therewith an arithmetic unit or response store circuit in the response store 22. The circuitry of the associative processor 10 is such that all bits of one word, one bit of all words, or a combination thereof may be operated upon simultaneously. In other words, one may read, write, or perform logic or search operations upon a plurality of bits simultaneously.

The parallel disc memory 12 is a "head-per-track"-magnetic disc memory. As is well known to those skilled in the art, such a memory comprises a plurality of parallel tracks, each track containing a plurality of bits. For utilization in the instant invention, each track has associated therewith its own head and read-write circuitry such that any number of tracks may be read or written in parallel. So it can be seen, the parallel disc memory 12 is quite conducive to adaptation with a system utilizing the associative processor 10 with its associative array 18. Since the parallel disc memory 12 is much less expensive than the apparatus comprising the memory 20, and since data may be permanently stored on the parallel disc memory 12, the utilization of such a memory as a mass memory for use with an associative processor is quite attractive.

Consideration shall now be given to the interrelationships between the associative processor 10 and the mass memory or parallel disc memory 12. As is well known to those skilled in the art, the disc memory 12 is actually a disc upon which data bits are radially positioned. As the disc is caused to rotate about its center the read-write circuitry and heads associated with each of the tracks of the disc cause information to be written thereon or read therefrom. Control of the rotation of the disc 12 is achieved by the servomechanism 14 and the transfer of data between the disc 12 and the associative processor 10 is controlled by the interface 16. It is contemplated that the parallel disc memory 12 will be of the 5250 series produced by Data Disc Incorporated of Palo Alto, California. The servomechanism 14 similarly produced by Data Disc Incorporated so as to provide the control signals necessary for regulating the rotation of the disc 12. The servo unit supplies both AC and DC power to the components of the disc memory unit and supplies the varying DC servo control voltage to the disc drive motor of the disc memory unit. In operation, the disc memory unit stores clock signals on pre-designated tracks of the disc and furnishes these clock signals to the servo unit. Synchronization is achieved by comparing similar clock signals from the associative processor 10 with those from the disc. The servo unit uses the comparison signal to generate a feedback signal to the disc memory unit to control the speed of the disc rotation.

The servomechanism 14 utilizes two modes of operation to control the speed of rotation; a single loop mode and a double loop mode. During the single loop mode of operation a pre-recorded clock signal, occurring once per revolution (1PR) of the disc on a designated track of the disc, and a corresponding reference clock from the AP 10 enable servomechanism 14 to supply a DC controlling signal to the disc drive motor of the disc memory 12 to achieve initial speed synchronization. Once initial speed synchronization has been achieved, the servomechanism 14 is switched to the normal double loop mode of operation. The double loop clock track contains a plurality of clock pulses per revolution (NPR) of the disc such that synchronization may be checked many times during each disc rotation and be finely maintained. The double loop clock pulses (NPR) are sensed and compared with reference clock pulses (NPR) from the associative processor 10 by the servomechanism 14 so as to maintain the requisite synchronization by controlling the disc motor speed over the MOTOR FEEDBACK line. This technique is well known and understood by those skilled in the art of memory discs.

The two clocks (1PR and NPR) required by the two modes of operation of the servomechanisum 14 are supplied over the CLOCK & CONTROL line to the interface 16 from the basic clock of the associative processor 10. The fundamental clock of the associative processor 10 produces a 10mhz clock by which the timing and control of the circuitry of the associative processor 10 is achieved. From this 10mhz clock a 30hz signal is preferably produced to be used by the servomechanism 14 as the 1PR clock in the single loop mode, and a 15khz clock is preferably produced for utilization by the servo 14 as the NPR clock in the double loop mode. The servo 14 uses the double loop mode clock to control the disc motor speed so as to keep pulse-to-pulse jitter under 15 nano-seconds.

The disc 12 further contains thereon a data clock track. It is this track which provides the bit timing clocks used throughout the disc system, one data clock pulse being common to all parallel bits. Data is stored onto the disc surface and read therefrom with respect to these data clock pulses and data transfers between the disc 12 and the associative processor 10 are also under control of this clock. As is well known in the art, the electronics of the disc uses the data clock track to generate a READ CLOCK, WRITE CLOCK, and an ORIGIN PULSE to respectively read data from the disc, write data onto the disc, and to indicate the beginning of the data storage bits of the disc. These clocks are passed over the CLOCKS line as shown. Since the data clock frequency is proportional to disc speed which is in turn controlled by the servomechanism 14 which is referenced to the processor's clock, the bit timing is directly related to the basic timing of the associative processor 10.

The disc 12 is divided into sectors; a sector being defined as the smallest unit of data which may be written onto the disc at a time. A data record may be written in one or more contiguous sectors as long as logic zeros are appended to fill up the last sector used. These sectors will generally all be of equal size but this need not necessarily be the case. A unique arrangement of guard bits is used to separate the sectors and decoding circuitry may be utilized to readily sense these divisions.

As can be seen from FIG. 1, and as will be elaborated on hereinafter, further connections are made among the various basic components 10, 12, 14 and 16 of the invention to achieve the objects thereof. Instruction words are passed along the instruction line from the AP 10 to the interface 16 to control the operation of the interface. The instruction word library is similar to those commonly used in digital computers and controls such functions as the reading, writing, and masking of data transfer and the clearing of the logic of the interface. The OUT DATA and the IN DATA lines, as well as the WRITE DATA and READ DATA lines are utilized respectively to transfer data into and out of the AP 10 and the disc 12, is shown. A CONTROL LINE allows the operator to select certain control functions on the panel of the system which pass through the interface to the AP to perform the selected function. There is further presented a WRITE ENABLE line whereby signals may be transferred from the interface 16 to the data disc 12 to cause the latter to receive data from the former. As will become apparent hereinafter, if the WRITE ENABLE is not actuated, then the data disc 12 will operate in the read mode.

Figures 2, 5:
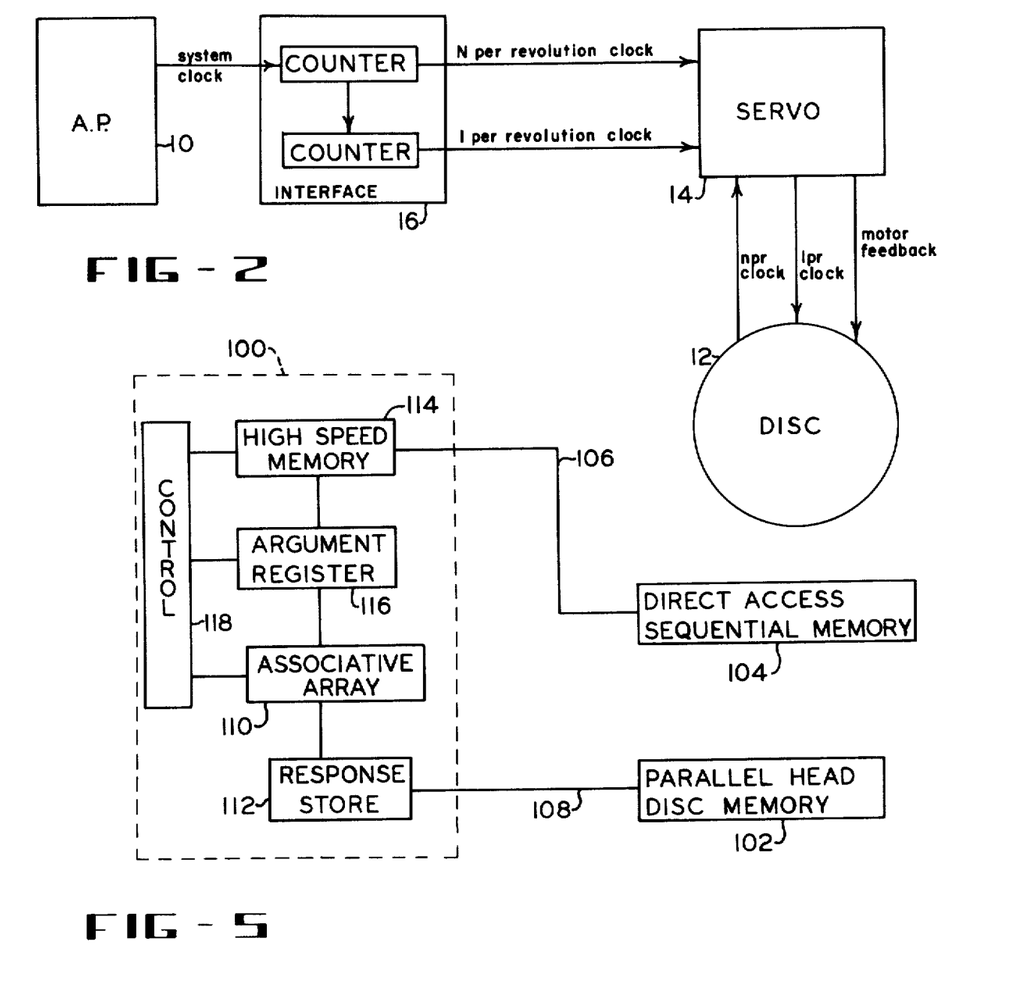
FIG. 2 is a schematic block diagram of the clock control circuitry interrelating the servo-mechanism with the disc memory and the associative processor.
FIG. 5 is a block diagram schematic of an embodiment of the invention utilizing a peripheral direct access sequential memory.

FIG. 2 illustrates the requisite speed control circuitry for utilization by the invention. Here it can be seen that a system clock passes from the AP 10 to the interface 16. The interface 16 receives the system clock into a counter 24; the counter 24 passing an output thereof to the counter 26. The counters 24, 26 are of the decoded output type where the counter 24 produces the NPR clock discussed hereinabove and the counter 26, which is obviously a divide by N counter, produces the 1PR clock. Of course, the system clock is the basic timing clock of the AP 10 and is appropriately responsible for generating the timing clock for the disc 12 by means of the NPR and 1PR pulses.

As can be noted, the disc 12 contains thereon, as discussed hereinabove, tracks containing the NPR and 1PR clocks. These clocks from the disc 12 pass to the servo 14 as do the similar clocks from the interface 16. It is the servo 14 which compares the two 1PR pulses in the single loop mode and the two NPR pulses in the double loop mode to control the rotational speed of the disc 12 by means of the motor feedback signal generated by the servo 14 as a consequence of the comparison between the pulses. It should be noted that the disc 12 is only connected to the servo-mechanism 14 and is not connected to the AP 10 or interface 16 as far as speed control regulation is concerned. The only output of the servo 14 is the motor feedback signal to the disc 12. It should further be noted that since the NPR and 1PR pulses are directly related to the system clock of the AP 10, the speed of rotation of the disc 12 will be similarly directly related to the system clock. Consequently, if the system clock is increased or decreased in frequency, corresponding increases and decreases will be realized in the disc rotation speed so that synchronization will always be maintained.

Figure 3:
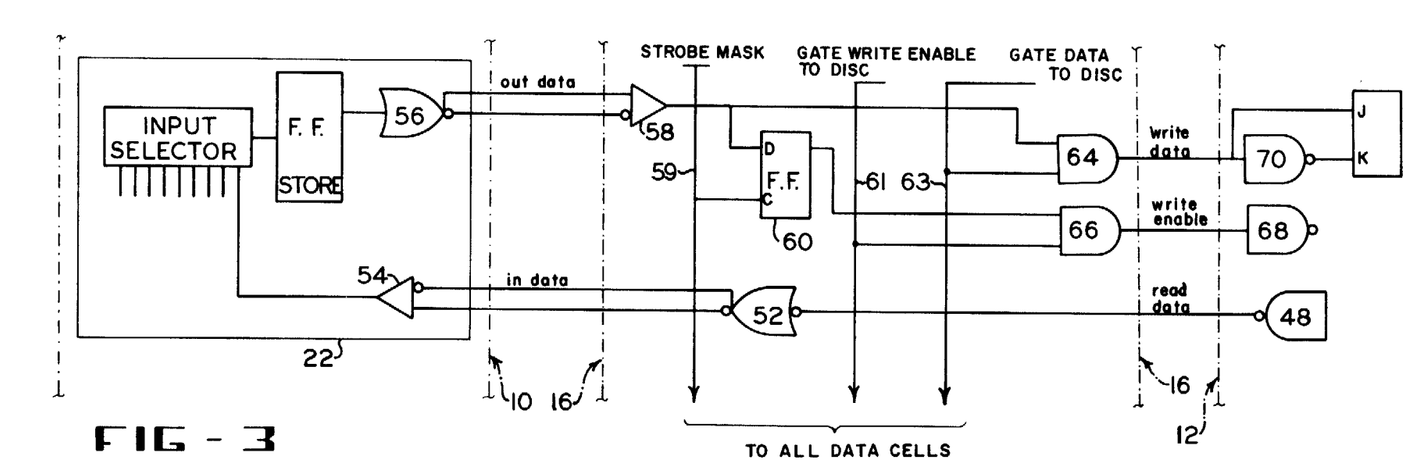
FIG. 3 is a schematic diagram of the data transfer circuitry of the interface of the invention.

The data paths and the control circuitry for data transfers between the disc 12 and the AP 10 are shown in FIG. 3. While the embodiment of FIG. 3 shows but a single data path, it should be understood that one such data path is present for each of the tracks of the disc 12 or response stores 22 of the AP 10. As was mentioned hereinabove, the disc 12 is always in the READ mode except when the WRITE ENABLE gate 68 is enabled. As was further mentioned, and is well known to those skilled in the art, a data clock bit associated with each bit of the parallel tracks of the disc 12 is utilized to create the READ/WRITE pulses necessary for the internal functioning of the disc 12. All reading and writing of the disc 12 is therefor controlled or enabled by the data clock bit. In normal operation, when the WRITE ENABLE signal is not present, the disc 12 operates in the READ mode supplying data from the associated bit through the gate 48, across the READ DATA line to the differential driver 52 which drives the IN DATA line to the differential receiver 54. The output of the differential receiver 54, which is the data received from the associated track of the disc 12, is applied to the input selector of the response store 22. As is clearly related in U.S. Pat. No. 3,863,233 mentioned above, the response store 22 is characterized by the presence of some type of solid state flip flop storage as indicated. The input selector, which may be a commonly known data or channel selector, is operative under control of the associative processor 10 to select any of various inputs to the flip flop storage. One such input is the output of the differential receiver 54. It should further be noted from reference to the cited copending application that data may be written from the flip flop storage to the associated word of the array 20. Consequently, data may be transferred from the disc 12 to the flip flop storage and then, under control of the AP, into the appropriate bit of the associated word in the array. As is also mentioned in the cited application, the response store 22 is capable of storing a mask under the control of the associative processor 10 such that only the unmasked response stores 22 will receive the data from their associated differential receivers 54. Thus, all of the tracks of the disc 12 are read simultaneously and gated to the response store 22 but only the unmasked elements of the response store 22 will receive the associated data.

The transfer of data from the AP 10 to the disc 12 is initially achieved by the transfer of data from the memory 20 through the input selector to the flip flop storage of the response store 22. Again, this procedure is clearly related in the aforementioned copending U.S. patent application Ser. No. 1495. The data is transferred from the flip flop storage to the differential driver 56 which passes the data across the OUT DATA line to the differential receiver 58. The output of the receiver 58 is connected to two points, the D input of the D-type flip flop 60 and an input of the NAND gate 64. The flip flop 60 is utilized to mask the input of the disc 12. The mask is presented from the flip flop storage of the response store 22 to the D input of the flip flop 60. The STROBE MASK signal over the line 59 clocks the related flip flops 60 accordingly setting or resetting the outputs thereof and thus enabling or inhibiting the associated NAND gates 66. As was mentioned hereinabove, the writing of data onto the disc 12 is achieved only when a WRITE ENABLE signal is present and this signal is created by the NAND gate 66. Consequently, the output of the flip flop 60 may be utilized to inhibit the gate 66 thus preventing the occurrence of the WRITE ENABLE pulse to the gate 68 and consequently masking certain tracks of the disc 12.

It should be readily apparent that the WRITE ENABLE pulse is thus created by a set output from the flip flop 60 and the coincidence of a GATE WRITE ENABLE pulse on the line 61. This enables the disc 12 to receive data and the presence of a GATE DATA PULSE on the line 63 enables the NAND gate 64 to receive and transfer the data received from the response store 22.

As has been discussed, the smallest amount of data which may be written onto the disc 12 at a time is defined as a sector. Consequently, the GATE DATA pulse on the line 63 is turned on for an amount of time equivalent to one sector's time period. The sectors are separated by an arrangement of guard bits, the guard bits being written onto the disc 12 so as to destroy any magnetic creep of a given sector's domain. In the instant invention, it is contemplated that the guard bits will be one or more zeros before and after each sector. To write such guard bits, the GATE WRITE ENABLE pulse on the line 61 is presented to the gate 66 for a time period equivalent to a number of bits prior to the presence of the GATE DATA pulse and is turned off a period of time equivalent to a number of bits after the GATE DATA pulse. Consequently the WRITE ENABLE pulse will be on for one or more bits before and after each sector but the GATE DATA pulse will only be on during the sector time period and zeros will consequently be written onto the track during such time thus presenting the guard bits.

Figure 4:
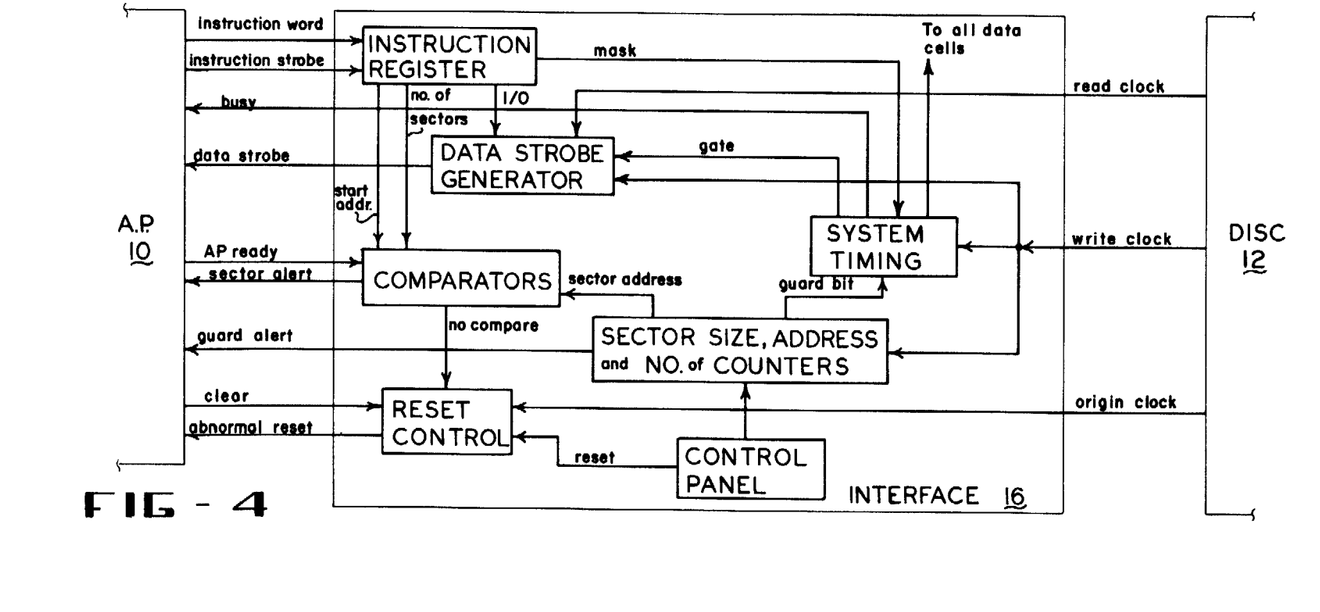
FIG. 4 is a detailed schematic diagram of the control circuitry of the interface of the invention.

FIG. 4 presents a detailed schematic of the remaining control circuitry of the interface 16. As can be seen, the disc 12 supplies a read, write and origin clock to the interface electronics. These three clocks are developed by the data disc logic from the data bit clock pulses discussed hereinabove. The WRITE CLOCK indicates that a bit has been written onto the data disc and the disc is now ready for the writing of a subsequent bit. The READ CLOCK is somewhat delayed from the write clock and creates the appropriate strobe signal to allow the passage of data from the disc 12 to the AP 10. The ORIGIN CLOCK is created by the lack of data bit clocks for a particular amount of time indicating that the end of the circular storage has been reached and the beginning will be close at hand. The ORIGIN CLOCK pulse provides a handy reference whereby any bit on the data disc may be found by reference to the number of bits from the origin by which it is spaced. As can be seen, it is the WRITE CLOCK signal which is responsible for the creation of the STROBE MASK, GATE WRITE ENABLE and GATE WRITE DATA signals.

Updated information regarding the accessibility of the storage bits of the rotating disc 12 is maintained by means of three counters; a sector size, a sector address, and a number of sectors counter. The sector size counter receives the write clocks from the disk 12, counting each of the clocks until a number of clocks equivalent to the number of bits in a sector has been counted. The next bit or bits are guard bits and this information is relayed to the system timing circuit. The sector size counter is then reset to begin again counting bits so as to define the next sector. The size of the sector is controllable from the control panel of the system and is operative to merely control the decoding of the sector size counter so as to regulate the sizes of sectors available in the system. Suffice it to say that this counter produces the signal at the end of the sector. The output of the sector size counter, which is a pulse at the end of each sector, is applied to the sector address counter, which keeps track of the addresses of the sectors. Consequently, the output of the sector address counter is the address of that particular sector being accessed at a given time. There is further provided a counter to count the number of sectors operated on. If data is to be transferred to a particular number of sectors, the sector address counter counts to the address of the first sector to be operated on and the operation begins. The number of sectors counter counts each sector operated on from the point of initiation of the operation and keeps a running total of this number of sectors. It should be understood that the instruction register receiving the instruction word from the AP 10 will designate the number of sectors to be operated on and thus it is important to count such number.

The AP 10 instruction register is operative to transfer instruction words to the instruction register of the interface 16. These instruction words indicate the starting address for an operation, the number of sectors to be operated on in the operation, and whether the operation is to be an input or an output of data with respect to the AP 10. The starting address and the number of sectors are maintained in the instruction register and applied to associated comparators. The same comparators respectively receive the outputs of the sector address counter and the number of sectors counter. When the output of the sector address counter is equivalent to the starting address from the instruction register an indication of the same is passed therefrom to the system timing circuit and similarly, when the output of the number of sectors counter equals the number of sectors to be operated on, this occurrence is indicated to the system timing circuit to indicate that the operation has been completed. Of course, the instruction word is loaded from the AP into the interface 16 under control of an instruction strobe as is well known in the art.

There is provided from the AP 10 an AP READY signal which passes through the comparators and is operative to inhibit the same from operating until the AP 10 is ready to perform the particular function. Thus, no data transfers or other operations are executed since the system timing will be inhibited until the AP is ready.

The reset circuitry of the invention is operative to reset all of the control circuitry of the interface so as to place the system in an idle state and clear the same so that preparation can be made for an operation. Such resetting is achievable by means of the actuation of a reset button on the control panel or receipt of the ORIGIN CLOCK from the data disc 12. Further, if the data disc is caused to pass about the origin twice with no compare being realized by the comparators, then a NO COMPARE signal is passed to the reset circuit to cause the resetting of the control circuitry. For instance, if, due to sector size, a sector address is chosen which is not achievable, then there will be no comparison in the comparators and such signal will be sent to the reset circuitry. In such a case, an ABNORMAL RESET signal is passed to the AP 10 to indicate that the particular instruction cannot be performed and the AP 10 is accordingly reset. A further means of resetting the system is through the CLEAR signal from the AP 10 from the interface 16. Before the loading of an instruction word or the beginning of an instruction, a CLEAR signal causes the resetting and preparation of the interface control logic.

As can be seen, there are two alert signals, SECTOR ALERT, and GUARD ALERT, which are passed from the interface 16 to the AP 10. The SECTOR ALERT comes from the comparator which compares the sector address and the starting address. In actuality, the sector address counter is caused to count somewhat ahead of the actual selector address so that a sector alert signal will be presented at a particular time interval ahead of the period at which the starting address will be accessible. This signal is effectively an interrupt signal to the associative processor 10 which indicates that the AP 10 must terminate its present operation to prepare for the transfer of data. Similarly the GUARD ALERT signal comes from the selector size counter and is present a fixed interval of time prior to the receipt of the guard bit before each sector. Again, this signal indicates to the AP 10 that the sector will be available in a fixed increment of time. The creation and utilization of such interrupt and preparation signals are well known and understood to those skilled in the art.

The system timing and data strobe generator of the invention are utilized to control the timing of data transfer between the AP 10 and the disc 12. This circuitry creates the signals necessary for timing the reading and writing of data onto and from the disc 12 and also creates the signals which control the response store 22 so as to cause it to receive data thereinto for storage in the AP memory 20 or transfer data from the memory 20 to the flip flop storage of the response store for transfer to the disc. As mentioned above with respect to FIG. 3, the GATE WRITE ENABLE signal over the line 61 must precede the occurrence of the GATE DATA signal over the line 63 and must also remain on for a period of time after the termination thereof for the purpose of writing the guard bits onto the disc track. To this end, the system timing circuit receives the WRITE CLOCK which occurs once for each bit of the disc 12 and is gated with the guard bit from the sector size counter to precisely initialize and latch the GATE WRITE ENABLE signal over the line 61 while inhibiting the GATE DATA pulse signal over the line 63. Thus, new guard bits are written as discussed above. After the guard bits have been passed, the guard bit signal terminates and thus enables the GATE DATA signal over the line 63 which allows the transfer of data. When the sector has been loaded, the guard bit signal from the sector size counter coincident with the appropriate WRITE PULSE again inhibits the GATE DATA signal over the line 63 thus causing new guard bits to be precisely written between each sector.

The system timing is enabled and inhibited by the START-STOP signals from the comparator; the START signal sensing when the output of the sector address counter is equivalent to the starting address from the instruction register and the STOP signal indicating when the number of sectors counter is equivalent to the number of sectors indicated in the instruction register.

The data strobe generator, creating the data strobe signal, is controlled by both the READ and WRITE clocks from the disc 12. When data is being written onto the disc 12, the WRITE CLOCK creates the data strobe signal and when data is being read from the disc into the AP 10, then the READ CLOCK controls. The I/O signal from the instruction register indicates whether there is to be an input or output of data and consequently which of two clocks, READ or WRITE, are to control. When data is being written from the AP 10 onto the disc 12, the DATA STROBE created by the WRITE CLOCK, strobes data from the memory 20 into the flip flop storage of the response store 22 to prepare it for writing onto the disc 12. When data is being read from the disc 12 into the memory 20, the DATA STROBE is based on the READ CLOCK and the DATA STROBE indicates to the response store 22 that the data may be strobed into the flip flop storage thereof. The DATA STROBE generator is gated by means of a GATE signal from the system timing circuit. This GATE signal controls the DATA strobe generator such that DATA STROBE signals are created only during the bits of a sector and not during guard bit time as well as guaranteeing that the strobe will occur only when the sectors of interest are accessible. In other words, the GATE signal is operative to regulate the DATA STROBE signal so that the latter occurs only when the sector or sectors of interest are accessible.

It should also be noted that a BUSY signal may be created by the system timing and passed to the AP 10 to indicate that the transfer of data is in progress. In other words, and is well known in the art, the BUSY signal inhibits the AP 10 from beginning any subsequent transfers of data while another transfer is still in progress. A BUSY signal is merely a level which exists until the transfer is completed.

If a mask is to be stored in the flip flops 60 as shown in FIG. 3, an instruction word indicating that a mask is to be stored is strobed into the instruction register from the AP 10. A MASK signal is then transferred to the system timing circuit and, upon receipt of the next write clock, a STROBE MASK signal is generated transferring the data from the flip flop storage element of the response store 22 to the mask register comprising the flip flops 60 of the interface 16. The transfer of the mask is consequently a simple and straightforward execution requiring only the indication from the instruction register that a mask is to be transferred and then a subsequent WRITE CLOCK from the disk 12 to actuate the STROBE MASK signal.

Heretofore there has been described a system combining, in part, a parallel head disk memory and an associative array processor. Utilizing such a system, records may be easily and rapidly maintained since filing of the same may be done in a sequential and unordered manner. Due to the use of the parallel input/output capabilities of both the parallel head disk and the associative array processor, and the simultaneous search-by-content capability of the associative array processor, search by any record or item key or any logical combination of such key can be performed nearly simultaneously within a large block or upon all of the records within a file. Technically, the above related device provides an ideal solution to file management problems; that is, posting of a new record can be accomplished in no more than a major cycle time of the memory (the revolution period for the parallel head disk) and retrieval in no more than two cycle times. Only one disadvantage is noted with the structure of the disclosed system; the entire file and all files must be contained on the parallel head disk. While this is not disadvantageous for small or medium sized files, the cost per record is inherently larger for parallel than for sequential track memories and hence, costs for the management of very large files can become economically prohibitive. It is consequently contemplated to include an additional structure for minimizing the use of the higher cost parallel head disk memory by utilizing more of a lower cost conventional sequential memory without serious consequence to performance. It will become apparent that such additional structure will not only be economical but will improve the performance of the system in the management of large files.

A block diagram of the structure of the invention providing for the increased economical storage capability is shown in FIG. 5. As can be seen, an associative array processor 100 is interconnected by means of a parallel input/output 108 to a parallel head disk memory 102 as discussed hereinabove. Further connected to the associative array processor 100 is a direct access sequential memory 104 connected by means of direct memory access 106. Comprising the associative array processor 100 is an associative array 110 interconnected to the parallel head disk memory 102 through a response store 112. The response store 112 is, of course, identical to that discussed hereinabove.

Further included in the associative array processor 100 is a high speed memory 114 which is interconnected to the direct access sequential memory 104. Interconnected between the array 110 and the memory 114 is an argument register 116 which, along with the two aforementioned elements, is connected to the control circuitry 118.

Fundamental to the concepts of the embodiment of the invention shown in FIG. 5 is that the parallel head disk memory 102 contains abbreviated record keys relating to the full data records maintained in the less expensive files of the direct access sequential memory 104. The parallel head disk memory 102 may, in accordance with the teachings of the invention, contain in a sequential and non-ordered manner the following information for each record contained in the direct access sequential memory 104: (1) The master key, (2) Item keys appropriate to the user's needs, and (3) Information relating to the location of the full record in the memory 104 such as the cylinder and track number of such data. Also fundamental to this concept of the invention is that all records in the memory 104 be sequentially added to the file in an unordered manner. Therefore, in both memoris 102 and 104 new records are added to the end of the file or to the first available space within the memory. As records are removed from the file, their former location in the two memories is recorded in the high-speed memory 114 along with the next location open at the end of each file. Therefore, adding to the file is as simple and efficient as can possibly be. Furthermore, the full records contained in the memory 104 need not be of a fixed length as long as they are added to the end of the file; this is an important feature in many applications and is difficult to achieve or wasteful of memory bits in conventional systems. The storage of data in this system is, quite obviously, of a most efficient nature. As will be seen directly, the acquisition of records is similarly fast and efficient.

To understand how a record location is accomplished, it is necessary to understand how the keys are formed. While there are many ways in which the record and item keys may be developed, the two basic procedures will be described: Direct encoding by table look-up and arithmetic algorithm. Using the first mentioned method, the disk memory 102 is used not only to store record and item keys along with the location in the master file of 104 that will contain the full record but also to store a directory. A directory is used in a "table look-up" manner to encode new records being entered into the file or queries used to search the file. The ability of the associative array 110 and the disk memory 102 to exchange data at extremely high rates and the ability of the associative array processor 100 to perform searches on the entire contents of the associative array simultaneously permits very rapid encoding of input data and decoding of data to be outputted. The directory of the disk memory 102 contains the individual key words or names that may appear in the records along with an arbitrary number, the word or name code. When a record is to be placed into a file, the record name and items to be keyed are first encoded. All or a block of the directory is entered into the associative array 110 through the parallel input/output 108. The record names and item to be encoded are deteched from the record and entered into the argument register 116. By exact match on the record name and item names, the encoded and compacted record along with the location of the next available space in the sequential memory 104 is obtained from the high speed memory 114 and is ready for entry into the next available space, also obtained from the high speed memory 114, in the disk memory 102. These compacted records comprise a "key file". By placing both the directory and the key file upon one disk of the disk memory 102, the entire encoding and entry into the memory 102 will require only one disk revolution.

It should be readily apparent that if a record is entered containing a word not in the directory, it can be automatically added to the directory and assigned the next available code number which is also stored in the high speed memory 114.

Once the record key is obtained the entire record with its key is stored in the sequential memory 104 in the next available location. If records or queries are coming at a rate faster than once per disk revolution, it should be noted that the encoding operation can be batched since array operations are quite fast as compared to disk data rates.

To perform a search, the query is encoded in a manner similar to record encoding just described. A logical search can then be performed on the compacting records in the key file in a manner presented with respect to FIGS. 1–4. In this instance, however, there is retrieved compacted and encoded records along with the location of each full record in the master file contained in the direct access sequential memory 104.

With the compacted and encoded record so retrieved, such records may be decoded by a reverse of the encoding operation; that is, exact match on code fields. The user may then acquire a compacted but decoded result. While this technique might be used for browsing, interracting with the file for modification dependent upon an immediate result, for obtaining some statistical or profile data on the entire field, or for lists of compacted records or inverted records, it is not generally considered the best aproach for data acquisition.

Once the compacted and encoded records are retrieved, the entire record may be acquired from the direct access sequential memory 104 by merely extracting the record key and associated direct access sequential memory location from the search and then retrieving from that location the full or selected parts of the records responding to the query.

It should be readily apparent to one skilled in the art that the table look-up method just described is quite useful where the number of records is very large compared to the number of items per record in the logical record structure. For example, if purchase orders are to be filed by purchase order number, it would be a simple matter to convert that number directly into a key. Similarly, part numbers could be directly encoded. Buyer name, vendor name, project or product name, etc., could be obtained by directory look-up. If, for example, there were 100,000 purchase orders in a year's time, with perhaps less than 100 buyers, 500 vendors and 50 projects, records can be retrieved directly, not only by purchase order number but by buyer, vendor, project or product name, or any other key the user considers significant. In such an example, both the directory and the key file will be small; much smaller than the master file containing the full records.

An alternate method for the formation of record and item keys is by use of arithmetic algorithms or the direct keying method. This method teaches that the record and item keys to be stored in the key file are directly encoded by arithmetic conversion. This method does not have the disadvantages of direct addressing since both the key file contained in the parallel head disk memory 102 and the master file contained within the direct access sequential memory 104 are organized sequentially and unordered; memory space being fully utilized. A potential disadvantage of this technique is that one or more unwanted responses to a query may be acquired along with the desired response. While this disadvantage is present, it is not of any grave significance if it does not occur too often since unwanted responses can be readily sorted out.

To illustrate the benefits of this technique, consider a passenger name record file for an airline seat reservation system consisting of 5 × 10⁶ records. An estimate of the master and key file sizes is given below in Table I. Assume that passenger name is Hash encoded using the first letter of the last name, the sum of the next three letters in the last name, and the initial of the first name.

TABLE I

|  | Master File | Key File |
|---|---|---|
| Passenger Name | 15 Bytes | — |
| Passenger Name Key | 4 Bytes | 4 Bytes |
| Itinerary Out | 20 Bytes | — |
| Itinerary In (Return) | 20 Bytes | — |
| Contact | 10 Bytes | — |
| Record Location (physical file, cylinder, track) | — | 2 Bytes |
| TOTALS/RECORD | 69 Bytes/Record | 6 Bytes/Record |
| TOTAL & FILE SIZE | 345 × 10⁶ Bytes | 30 × 10⁶ Bytes |

As can be seen from this example, there is a considerable savings of more than 11:1 in disk memory storage by using this technique. Since the parallel head disk memory 102 costs can be expected to be more than 10 times those of the direct access sequential memory 104, this savings becomes extremely important.

It should be readily apparent that if all of the data had been stored on parallel head disk memories in the example above given, a substantial increase in search time would result. Indeed, it has been shown that by using a plurality of parallel head disk memories in accordance with the teachings of the invention disclosed in FIGS. 1 - 4, the average search time would be 440 milliseconds while, utilizing the structure presented in FIG. 5, the average search time in the example given would be 50 milliseconds. There is consequently a 9:1 improvement in the speed by using a combination of parallel head disk memory and direct access sequential memory.

By adapting the structure of the invention as presented in FIGS. 1 - 4 with the direct access sequential memory as shown in FIG. 5, the variation on the theme of the invention as shown in the latter figure results in rapid logic search time on file keys, the ability to receive much essential information directly from the search, the ability to retrieve from the search the location in the sequential memory of the full records responding to a query, the ability to sort the responses by location to minimize access time to the sequential memory, the ability to compact data so as to efficiently use storage space, and fundamentally the means for utilizing the best features of unordered sequential files and of highly inverted indexed files simultaneously without paying the penalty in cost and performance when a large file is completely recorded in user language on the parallel head disk memory.

It should now be apparent that there is disclosed herein a unique data processing system wherein the speed of data processing of an associative processor is coupled with economical and permanent data storage capability of a magnetic disc memory. The provision of an interface circuit and a servo-mechanism interconnecting the AP and the disk allows for the utilization of the attributes of each. While in accordance with the patent statutes only the best mode and preferred embodiment of the invention contemplated by the inventors has been presented and described in detail, it is to be understood that the invention is not limited thereto or thereby. Consequently, for a true appreciation of the scope of the invention reference should be had to the accompanying claims.

What is claimed is:

1. A high speed information processing system, comprising:
    an associative processor having a memory section maintaining a plurality of bit-comprised words of data and having an identical arithmetic logic circuit associated with each such word for performing arithmetic and logic operations on said plurality of data words simultaneously;
    a magnetic memory disc, having a plurality of concentric associative storage tracks thereon, separate and distinct from the data processor, wherein bulk storage of data words is maintained; and
    means interconnecting the associative procesor and the memory disc to affectuate data word transfers therebetween.

2. The high speed information processing system as recited in claim 1 wherein each track of the magnetic memory disc has associated therewith its own read-write circuit for transferring data to and from said track, and each track comprises a plurality of radially aligned data storage bits.

3. The high speed information processing system as recited in claim 2 wherein the means interconnecting the associative processor and the disc memory comprises a servo-mechanism synchronizing the rotational speed of the disc memory with signals from the associative processor and an interface circuit regulating the flow of data between the disc memory and the associative processor in accordance with control signals from the associative processor.

4. The high speed information processing system as recited in claim 3 wherein the memory section of the associative processor an constitutes associative array having parallel access capability and said plurality of arithmetic logic circuits and wherein the interface circuit interconnects each of the read-write circuits of the disc memory with a respective one of said arithmetic logic circuits for regulating the data word transfers between the read-write circuits and the arithmetic circuits.

5. The high speed information processing system as recited in claim 3 wherein the interface circuit comprises:
    a first circuit means interconnected between the associative processor and the disc memory for indicating to the associative processor when the disc memory is ready for accessing a preselected radial bit location; and
    a second circuit means interconnecting the first circuit means, the associative processor, and the disc memory for indicating to the associative processor when a predetermined number of accesses to disc memory have been made.

6. Apparatus for storing and rapidly processing large volumes of data, comprising:
    an associative processor having a memory section containing a plurality of bit-comprised data words and a plurality of identical arithmetic logic units, one such unit associated with each said data word of the memory, and means for performing logic and arithmetic operations upon said plurality of data words simultaneously, a magnetic disc memory having a plurality of tracks of radially positioned data storage bits, each track having associated therewith its own read-write circuit; and means interconnecting the associative processor and the parallel disc magnetic memory to achieve synchronous transfers of data words therebetween.

7. The apparatus as recited in claim 6 wherein said interconnecting means comprises:

a servo-mechanism causing the disc memory to rotate at a preselected speed in accordance with the synchronization of signals contained on the disc and signals generated by the associative processor; and an interface circuit interconnecting the plurality of arithmetic logic units of the associative processor with the read-write circuits of the magnetic disc memory for regulating the transfer of said data words therebetween in accordance with logic signals received from the associative processor.

8. The apparatus as recited in claim 7 wherein the interface circuit comprises a first circuit means for indicating to the associative processor when a preselected radial bit on the disc memory is accessible and a second circuit means indicating to the associative processor when a preselected number of accesses have been made to the disc memory.

* * * * *